United States Patent Office 3,247,093
Patented Apr. 19, 1966

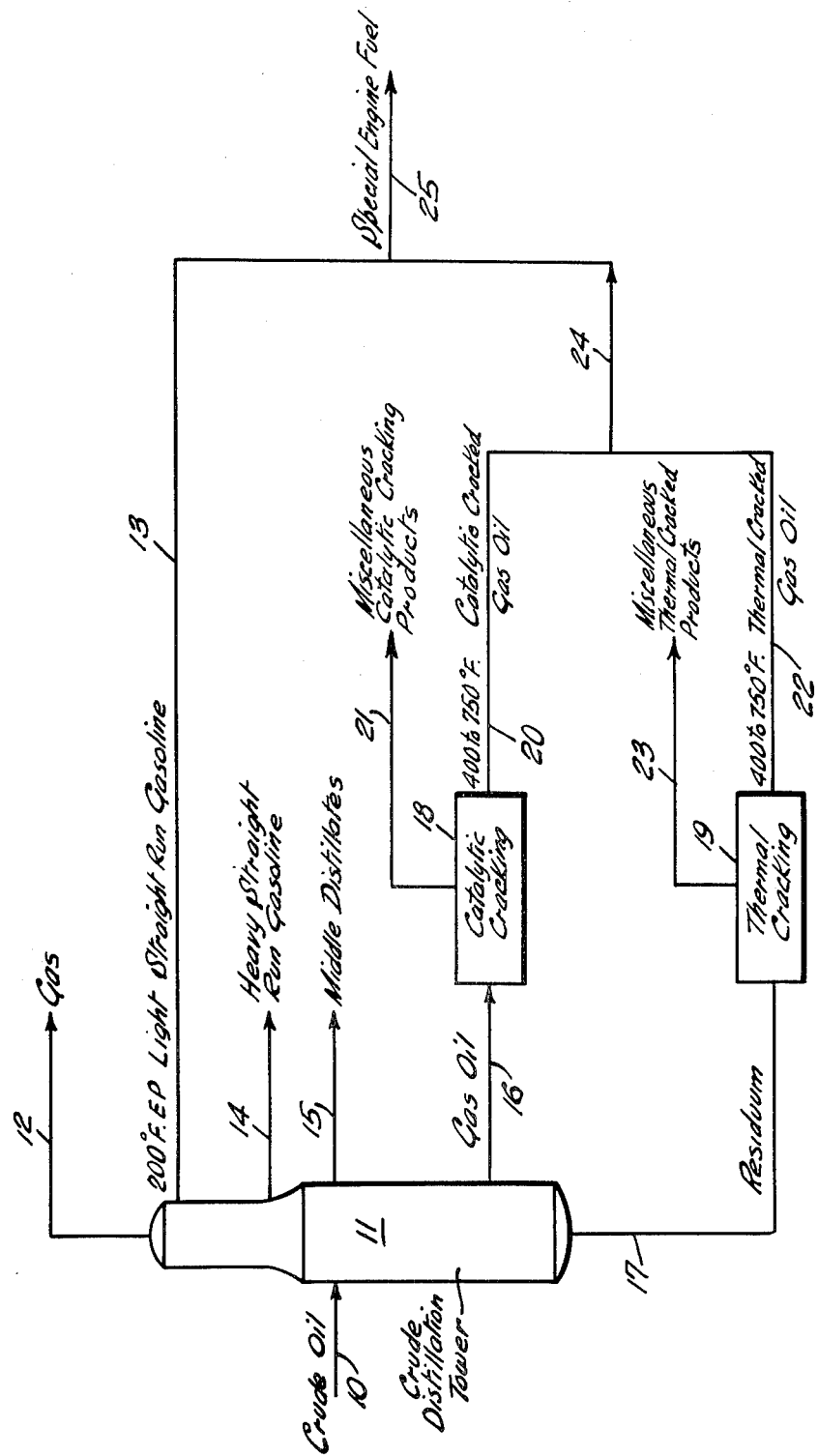

3,247,093
NON-KNOCK LIMITED ENGINE FUEL AND
METHOD OF MAKING IT
James R. Howard, Jr., Groves, and Charles K. Etner, Houston, Tex., assignors to Texaco Inc., New York, N.Y., a corporation of Delaware
Original application Oct. 9, 1962, Ser. No. 229,327, now Patent No. 3,179,090, dated Apr. 20, 1965. Divided and this application Sept. 8, 1964, Ser. No. 395,094
2 Claims. (Cl. 208—15)

This application is a division of Serial No. 229,327 filed October 9, 1962, now Patent No. 3,179,090.

This invention relates to a method of operating an internal combustion engine and more particularly an internal combustion engine employing a swirling stratified combustion mixture which is not knock limited. In other aspects the invention relates to a novel fuel and its method of manufacture.

U.S. Patent 2,484,009 which issued October 11, 1949 to Everettt M. Barber describes an internal combustion engine which is not knock limited. In this engine, knocking will not occur irrespective of the octane number of the fuel employed. This engine, which will be referred to hereinafter as the swirling stratified combustion mixture non-knock limited engine, is characterized as a reciprocating piston internal combustion engine wherein air is introduced into the engine cylinder in a manner to impart a high velocity air swirl in the combustion space of said cylinder which persists at least to the end of the compression stroke, fuel is injected during the latter part of the compression stroke into the compressed swirling air at a localized portion of the combustion space with the first increment of injected fuel promptly forming with the admixed swirling air a stratified combustible mixture which is positively ignited to form a flame front before sufficient fuel has been introduced into the cylinder to produce knock, and the injection of fuel is continued immediately in advance of the formed flame front so that additional increments of combustible mixture are progressively formed and burned substantially as rapidly as formed. In this engine, air unmixed with fuel, or air containing insufficient fuel to support combustion, is introduced into the combustion chamber and compressed on the compression stroke. Fuel is injected into this compressed air at a point near the top of piston travel, under conditions such that all or part flash vaporizes or exists in vapor state to form a combustible fuel vapor-air mixture at the point of ignition and with a comparatively short travel from the point of injection. The amount and direction of fuel injection during this period from injection to ignition is so controlled that the fuel mixes only with a localized portion of the air within the combustion space. This first increment of injected fuel forms a localized combustible mixture which is immediately ignited by spark or other suitable means, which establishes a flame front. The injection of the fuel is continued during the balance of the injection period into a narrow zone or zones of the combustion chamber immediately in advance of the flame front in its direction of burning.

The net result is that any combustible fuel-air mixture undergoing combustion within the cylinder is so rapidly consumed after formation that it is, at all times, cushioned by a mass of incombustible gas, either air or products of combustion, or both. Consequently, there is eliminated the formation of highly compressed and heated end gases consisting of combustible fuel-air mixture, and knocking is not possible.

In accordance with this invention a composition consisting essentially of 60 to 90, preferably 65 to 80, volume percent of a cracked gas oil boiling within the range of 400 to 750° F. and 10 to 40, preferably 20 to 35, volume percent of a 200° F. end point straight run gasoline is injected as the fuel into the combustion chambers of the aforesaid swirling stratified combustion mixture non-knock limited engine.

An object of this invention is to provide a means of operating a swirling stratified combustion mixture non-knock limited engine with fuels readily available in large quantities at low cost. Another object is to provide a suitable fuel for the aforesaid engine comprised of a major portion cracked gas oils boiling within the range of about 400 to 750° F. A further object is to provide a method of manufacturing such a fuel. Other objects and advantages of the invention will be apparent from the following description when taken in conjunction with the appended claims and attached drawing.

In the refining of crude oil, typically the crude oil is distilled into gas, light straight run gasoline, heavy straight run gasoline, middle distillates, gas oils, and residuum. The gas is further processed to separate fuel gas, liquefied petroleum hydrocarbon fractions, and pressuring agents for gasoline manufacture. The light straight run gasoline is usually restricted to blending lower octane fuels since it is of a relatively low octane number and it is difficult to upgrade for premium fuel use. Heavy straight run gasoline is an excellent feed stock for catalytic reforming producing premium quality fractions by high octane motor fuel manufacture. The middle distillates boiling within the range of about 400 to 750° F. are typically employed in the manufacture of diesel fuel, jet fuel, kerosene, and heating oils. Higher boiling gas oils and middle distillates unsuited for fuel use are employed as feed stock for catalytic cracking to produce gas, gasoline blending fractions, catalytic cracked gas oils and heavy cracked gas oil for heavy fuel blending. The catalytic cracked gas oil boiling within the range of 400 to 750° F. is produced in large quantities and is relatively unsuited for the manufacture of middle distillate fuels because of its aromatic nature. Residuum from crude still operations is typically subjected to thermal cracking, for example coking, to reduce the production of heavy fuel oil and to produce olefinic gases and thermal cracked gasoline which may be further processed for inclusion in motor fuel and an aromatic cracked gas oil boiling within the range of about 400 to 750° F. The cracked gas oils from catalytic and thermal cracking are typically recycled to cracking operations to convert them to valuable materials. However, cracked gas oils are relatively poor cracking stocks because of their aromatic nature and tend to produce low yields of desirable products and excessive carbon deposits in catalytic cracking. These cracked gas oils are unsuited for diesel fuel because of their low cetane numbers and are unsuited for jet fuel since they exhibit poor combustion characteristics and burn with a smoky luminous flame.

When employed as fuel in the swirling stratified combustion mixture non-knock limited engine fuels produced from cracked gas oils are found to be excellent sources of energy since they exhibit a relatively high heat of combustion per volume of fuel, but their use is accompanied by relatively poor start-up and warm-up characteristics, by excessive engine wear and by less efficient operation than would be expected on the basis of their calorific values. Light straight run gasoline in itself is a satisfactory fuel from a volatility standpoint for a swirling stratified combustion mixture non-knock limited engine but is not fully interchangeable with other available higher boiling distillate fuels such as diesel fuel or kerosene because the gravity and viscosity are so different that injectors designed for the heavier fuels provide erratic feed with the lighter fuels particularly at low load or idle conditions. Conversely, injectors suitable for low load and idling with light fuels produce poor dispersion of heavy fuels under full load conditions. Light straight run gasoline is unsuited for use as an exclusive fuel since it lacks lubricating qualities required for prolonged engine life. Furthermore, light straight run gasoline is available in relatively limited supply from crude stilling operations as compared with the availability of higher boiling distillates and gas oils. Light straight run gasoline is also subject to excessive losses in handling, storage and distribution because of its volatility.

In accordance with this invention, a fuel is prepared comprising a major portion of cracked gas oil and a minor portion of a low boiling non-aromatic hydrocarbon, for example 200° F. end point light straight run gasoline. This mixture exhibits excellent starting and warm-up characteristics and concomitantly achieves improved combustion, reduced engine wear, and increased thermal efficiency. The relatively small amount of low boiling hydrocarbon apparently improves the starting and warm-up characteristics of the mixture by improving volatilization of the fuel. Volatilization of a part of the fuel assists in forming a combustible mixture. This improved distribution of the fuel also improves the smoothness of combustion so that warm-up of the engine is facilitated. It appears that wear of the engine is related at least in part to the aromatic character of the cracked gas oil component of the fuel. Although the aromatics are only slightly diluted by the non-aromatic straight run the resulting change in combustion characteristics significantly reduces wear and increases engine efficiency. The blend of light straight run gasoline and cracked gas oil is similar in viscosity and gravity to a diesel fuel or kerosene so that it is interchangeable without injector modification. Effective injector lubrication is provided by the gas oil component.

As is known, the swirling air fuel mixture tends to provide a "skin effect" which reduces the heat transferred by conduction from the combustion zone through the cylinder walls as compared with a conventional engine. It appears, unexpectedly, that the heat transferred from the combustion zone to the cylinder walls by radiation is also significantly reduced when employing the light straight run cracked gas oil blend as compared with cracked gas oil alone since the blend burns with a less luminous or less radiant flame. Since less heat is lost from the combustion zone, greater efficiency in fuel use is achieved.

The figure illustrates a method of manufacturing a fuel useful in a swirling stratified combustion mixture non-knock limited engine. A crude oil in line 10 is introduced into crude distillation tower 11. In crude distillation tower 11, the crude oil is distilled into fractions adapted for further processing in the manufacture of petroleum products. Gas in line 12, straight run gasoline, heavy straight run gasoline in line 14 and middle distillates in line 15 are withdrawn for the manufacture of petroleum products, not shown. The 200° F. end point light straight run gasoline fraction is withdrawn through line 13. Gas oil in line 16 is passed to catalytic cracking facility 18. Catalytic cracking facility 18 may be a conventional cracking process employing, for example, silica alumina or magnesia alumina cracking catalyst in powder, granule or bead form in fluidized, moving or fixed beds. A 400 to 750° F. catalytic cracked gas oil is withdrawn through line 20. Other products of catalytic cracking grouped together as miscellaneous catalytic cracked products and including, for example, gases, gasoline and heavy oil boiling above 750° F., are discharged through line 21 for recovery and use not shown. Residuum from crude distillation tower 11 is withdrawn through line 17 and passed to thermal cracking facility 19. Thermal cracking facility 19 may be a conventional thermal cracking process, for example, recycle cracking, visbreaking or coking. A 400 to 750° F. thermal cracked gas oil is withdrawn through line 22. Other products of thermal cracking grouped together as miscellaneous thermal cracked products including for example, gas, gasoline and heavy oil boiling above 750° F. are discharged through line 23 for recovery and use not shown. The catalytic cracked gas oil and thermal cracked gas oil from lines 20 and 22 respectively are combined in line 24. Light straight run gasoline in line 13 is blended with the cracked gas oil in line 24 in proportion forming a blend of 10 to 40 percent light straight run gasoline. The blend of light straight run gasoline and cracked gas oil in line 25 is discharged for use as special engine fuel.

EXAMPLE

A special engine fuel is prepared by blending a 200° F. end point light straight run gasoline with a cracked gas oil forming a blend of 30 percent light straight run and 70 percent cracked gas oil. Laboratory tests of the light straight run, cracked gas oil, and blend are shown in Table I.

Table I

|  | 200° F. EP Light Straight Run | Cracked Gas Oil | Blend 30% Light Straight Run—70% Cracked Gas Oil |
| --- | --- | --- | --- |
| Distillation, ASTM ° F.: |  |  |  |
| IBP | 114 | 400 | 120 |
| 10 | 128 | 480 | 165 |
| 50 | 152 | 570 | 320 |
| EP | 200 | 700 | 680 |
| Percent Aromatics | 2.9 | 37.0 | 27 |
| Gravity, ° API | 79.7 | 29 | 39.8 |
| Viscosity, SUS at 100° F |  | 40 | 36 |
| Luminometer No.[1] | 147 | 13 | 28 |

[1] "Proposed Method of Test for Luminometer Numbers of Aviation Turbine Fuels,' ASTM D-2 Book of Standards, Appendix VIII, 1157 American Society for Testing Materials, Philadelphia, 1959.

The foregoing special engine fuel is used to start up and operate a swirling stratified combustion mixture non-knock limited engine. The engine employed has a 3¼" bore, 4½" stroke and is operated at a compression ratio of 10.0:1. The fuel injection system employs a single barrel pump and nozzle with a single hole orifice plate. Employing the foregoing fuels, the engine starts immediately upon cranking and operates smoothly during warm up and full load conditions.

We claim:
1. A fuel composition consisting essentially of 10 to 40 volume percent of a 200° F. end point straight run gasoline and 60 to 90 volume percent of a cracked gas oil boiling within the range of 400 to 750° F.

2. A method of manufacturing a fuel for a swirling stratified combustion mixture non-knock limited engine which comprises:
distilling a crude oil into fractions comprising a 200° F. end point light straight run gasoline, gas oil, and residuum,
contacting said gas oil with a cracking catalyst under cracking conditions forming a catalytic cracked gas oil boiling within the range of 400 to 750° F.,
cracking said residuum under thermal cracking conditions forming a thermal cracked gas oil boiling within the range 400 to 750° F., and
combining said 200° F. end point light straight run gasoline with a cracked gas oil selected from the group consisting of said catalytic cracked gas oil, said thermal cracked gas oil, and their mixtures in proportion forming an internal combustion engine fuel consisting essentially of 60 to 90 volume percent of said cracked gas oil and 10 to 40 volume percent of said 200° F. end point straight run gasoline.

No references cited.

DELBERT E. GANTZ, *Primary Examiner.*